US011086620B2

(12) United States Patent
Pham

(10) Patent No.: US 11,086,620 B2
(45) Date of Patent: *Aug. 10, 2021

(54) SYSTEMS AND METHODS FOR AUTOMATIC IDENTIFICATION AND RECOMMENDATION OF TECHNIQUES AND EXPERTS

(71) Applicant: Capital One Services, LLC, McLean, VA (US)

(72) Inventor: Vincent Pham, Champaign, IL (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/587,412

(22) Filed: Sep. 30, 2019

(65) Prior Publication Data

US 2020/0201627 A1 Jun. 25, 2020

Related U.S. Application Data

(63) Continuation of application No. 16/227,553, filed on Dec. 20, 2018, now Pat. No. 10,474,457.

(51) Int. Cl.
*G06Q 10/06* (2012.01)
*G06F 8/77* (2018.01)
(Continued)

(52) U.S. Cl.
CPC .............. *G06F 8/77* (2013.01); *G06F 16/958* (2019.01); *G06F 16/9535* (2019.01); *G06F 16/9538* (2019.01); *G06N 20/00* (2019.01)

(58) Field of Classification Search
CPC ...... G06F 8/77; G06F 16/9538; G06F 16/958; G06F 16/9535; G06F 8/20; G06F 8/75;
(Continued)

(56) References Cited

U.S. PATENT DOCUMENTS

| 2005/0138111 | A1 | 6/2005 | Aton et al. | |
|---|---|---|---|---|
| 2010/0211932 | A1* | 8/2010 | Jones | G06F 8/20 717/124 |

(Continued)

OTHER PUBLICATIONS

Lui et al., "Pair programming productivity," Jun. 16, 2006 (Year: 2006).

(Continued)

*Primary Examiner* — Daxin Wu
(74) *Attorney, Agent, or Firm* — Troutman Pepper Hamilton Sanders LLP; Christopher J. Forstner; John A. Morrissett

(57) ABSTRACT

A system including one or more processors; and at least one memory storing computer code that, when executed by the one or more processors, is configured to cause the system to: receive data representative of first text indicative of a first draft coding script; query a database storing coding technique information corresponding to a plurality of coding techniques, the query comprising a first request including indications of a first coding technique classification of a first coding technique of the first draft coding script; receive, responsive to an identification of the first coding technique classification within the database, indications of one or more authors of corresponding coding techniques; generate a first recommendation comprising an identification of a first expert among the one or more authors; and dynamically display the first recommendation.

20 Claims, 5 Drawing Sheets

FIG. 5

(51) Int. Cl.
  *G06N 20/00* (2019.01)
  *G06F 16/9535* (2019.01)
  *G06F 16/958* (2019.01)
  *G06F 16/9538* (2019.01)

(58) Field of Classification Search
  CPC .......... G06F 8/33; G06F 8/36; G06F 16/3331; G06N 20/00; G06Q 10/063112
  See application file for complete search history.

(56) References Cited

U.S. PATENT DOCUMENTS

| | | | | |
|---|---|---|---|---|
| 2015/0100940 | A1* | 4/2015 | Mockus | G06F 8/70 717/101 |
| 2017/0147291 | A1* | 5/2017 | Vega | G06F 8/30 |
| 2018/0260193 | A1* | 9/2018 | Polisky | G06F 8/70 |
| 2018/0349106 | A1* | 12/2018 | Makkar | G06F 8/33 |
| 2018/0357511 | A1* | 12/2018 | Misra | G06K 9/6215 |
| 2019/0129714 | A1 | 5/2019 | Wright | |
| 2019/0303108 | A1* | 10/2019 | Fu | G06F 8/33 |

OTHER PUBLICATIONS

Matter et al., "Assigning bug reports using a vocabulary-based expertise model of developers," IEEE 2009 (Year: 2009).

Mockus et al., "Expertise Browser: A Quantitative Approach to Identifying Expertise," ACM, May 19, 2002 (Year: 2002).

\* cited by examiner

SYSTEMS AND METHODS FOR AUTOMATIC IDENTIFICATION AND RECOMMENDATION OF TECHNIQUES AND EXPERTS

CROSS-REFERENCE TO RELATED APPLICATIONS

This application is a continuation of, and claims priority under 35 U.S.C. § 120 to, U.S. patent application Ser. No. 16/227,553, filed Dec. 20, 2018, the entire contents of which is incorporated fully herein by reference.

TECHNICAL FIELD

Embodiments of the present disclosure relates to systems and methods for identifying techniques and experts, and more particularly providing systems and methods for generating and updating technique and expert databases and providing user interfaces that can receive and automatically process requests for technique and expert recommendations using the databases.

BACKGROUND

In large organizations, inefficiencies arise from specialization and inability to optimally coordinate. For example, it is often difficult to identify experts that may be added to teams or otherwise assist with projects or tasks due to deficiencies in record-keeping and large amounts of information being stored in various places. Therefore, identifying individuals who have experience in a certain field or might be well-suited for a task at hand is not easily accomplished. For instance, if an employee is looking to implement a new machine-learning technique, their first source of information may be blogs and documentation online. As such, projects are often completed without the assistance of an expert in the organization. This can result in significant inefficiencies and losses incurred by the organization. Moreover, it is difficult to track expert skills within an organization, as individual expertise changes over time.

Accordingly, there is a need for improved systems and methods for automatic identification and recommendation of techniques and experts. Embodiments of the present disclosure are directed to this and other considerations.

SUMMARY

Embodiments of the present disclosure can include a system including: one or more processors; and at least one memory storing computer code that, when executed by the one or more processors, is configured to cause the system to: receive data representative of first text indicative of a first draft coding script; query a database storing coding technique information corresponding to a plurality of coding techniques, the query including a first request including indications of a first coding technique classification of a first coding technique of the first draft coding script; receive, responsive to an identification of the first coding technique classification within the database, indications of one or more authors of corresponding coding techniques; generate a plurality of recommendations, each recommendation including an identification of an expert among the one or more authors; and dynamically display the plurality of recommendations.

In some embodiments, the computer code, when executed by the one or more processors, may be further configured to cause the system to determine that the first draft coding script includes the first function by: parsing the first text to identify one or more functions within the first text; and comparing each of the one or more functions to a library including a plurality of functions.

In some embodiments, the computer code, when executed by the one or more processors, may be further configured to cause the system to: receive an indication instructing the system to test the first draft coding script; execute the first draft coding script; and responsive to identifying one or more errors in the first draft coding script, output an error message and automatically generate the request to identify the first expert and query the database.

In some embodiments, the computer code, when executed by the one or more processors, may be further configured to cause the system to: generate links to one or more coding documents authored by the first expert; and display the first recommendation in a floating window with the one or more links to coding documents.

In some embodiments, the computer code, when executed by the one or more processors, may be further configured to cause the system to: determine a respective number of coding scripts including the first draft coding script associated with each of the one or more authors; and identify the first expert among the one or more authors based on the respective number of coding scripts.

In some embodiments, the computer code, when executed by the one or more processors, may be further configured to cause the system to: determine a respective number of lines of code associated with each one or more authors, the number of lines including lines of code in the first draft coding script; and identify the first expert among the one or more authors based on the respective number of lines of code.

In some embodiments, the computer code, when executed by the one or more processors, may be further configured to cause the system to: analyze the data representative of the first text as the first text is drafted to identify the first coding technique; and automatically generate the first request.

In some embodiments, generating the first recommendation may include selecting the first expert from among the one or more authors based on a date representative of when the first expert drafted the corresponding coding technique.

In some embodiments, the computer code, when executed by the one or more processors, may be further configured to cause the system to: receive, responsive to an identification of the first function within the database, indications of an alternative coding technique performing a same function as the first coding technique; generate a second recommendation including an identification of a second expert among the one or more authors, the second expert being associated with the alternative coding technique; and dynamically display the second recommendation.

Embodiments of the present disclosure can include a system including: one or more processors; and one or more memory devices storing computer code that when executed by the one or more processors causes the system to: receive a first text indicative of a coding script; responsive to identifying a first coding technique from the first text, query a database to determine if the database recognizes the first coding technique, the database storing coding technique classifications and language drafted by a plurality of authors; responsive to receiving an indication that the database does not recognize the first coding technique, create a model of the first text including one or more words associated with the first coding technique; send a first update to the database including the model and a name for each of one or more respective authors of the coding technique; determine if the coding script includes additional techniques by comparing the first text to a library of coding technique terms; and responsive to identifying a second coding technique based on the library of coding techniques, send a second update to the database including data indicative of the second coding technique.

In some embodiments, the computer code, when executed by the one or more processors, may be further configured to cause the system to scrape a repository to identify a plurality of scripts including a plurality of coding techniques; identify one or more authors associated with each coding technique of the plurality of coding techniques based on information stored in the repository about the plurality of scripts; and store data indicative of the plurality of coding techniques and the respective one or more authors in the database.

In some embodiments, at least one script of the plurality of scripts can be a draft script.

In some embodiments, the computer code, when executed by the one or more processors, may be further configured to cause the system to: output, to an administration device, a request for verification that the additional coding techniques are of a particular type; and send the second update responsive to receiving a verification from the administration device.

In some embodiments, receiving the first text may include: recognizing, from the first text, a first draft coding technique using one or more natural language processing techniques and comparing the first text to the library storing a plurality of coding techniques.

In some embodiments, the computer code, when executed by the one or more processors, may be further configured to cause the system to: parse the first text to identify the first draft coding technique; generate a bag of words corresponding to the first draft coding technique based on the parsed first text; and send the first update to the database including the bag of words.

Embodiments of the present disclosure can include a method including: receiving, at a first computing device, a request to identify a coding expert, the request including first text indicative of a draft implementation of a first machine-learning algorithm; querying a database to determine if the database includes a first machine-learning coding technique corresponding to the first machine-learning algorithm, the database storing data indicative of machine-learning functions and languages corresponding to a plurality of authors; responsive to receiving an indication that the database does not have the first machine-learning coding technique, updating the database by: analyzing the first text using one or more natural language processing techniques; generating a model of the first text including one or more words associated with machine-learning algorithms; updating the database to include data indicative of the first text and a name of each of one or more authors of the first text; determining if the draft includes additional machine-learning coding techniques by comparing the first text to a library of machine-learning techniques terms; and responsive to identifying a second coding technique based on the library of machine-learning coding techniques, updating the database to include data indicative of the second machine-learning coding technique.

In some embodiments, the method can further include scraping a repository to identify a plurality of scripts including a plurality of machine-learning algorithms; identifying one or more authors associated with each machine-learning algorithm of the plurality of machine-learning algorithms based on information stored in the repository about the plurality of scripts; and storing data indicative of the plurality of machine-learning algorithms and the respective one or more authors in the database.

In some embodiments, at least one script of the plurality of scripts is a draft script.

In some embodiments, the method can further include outputting, to an administration device, a request for verification that the additional machine-learning algorithms are of a particular type; and sending the second update responsive to receiving a verification from the administration device.

In some embodiments, receiving the first text can include: recognizing, from the first text, a first draft machine-learning algorithm using one or more natural language processing techniques and comparing the first text to the library storing a plurality of machine-learning algorithms.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
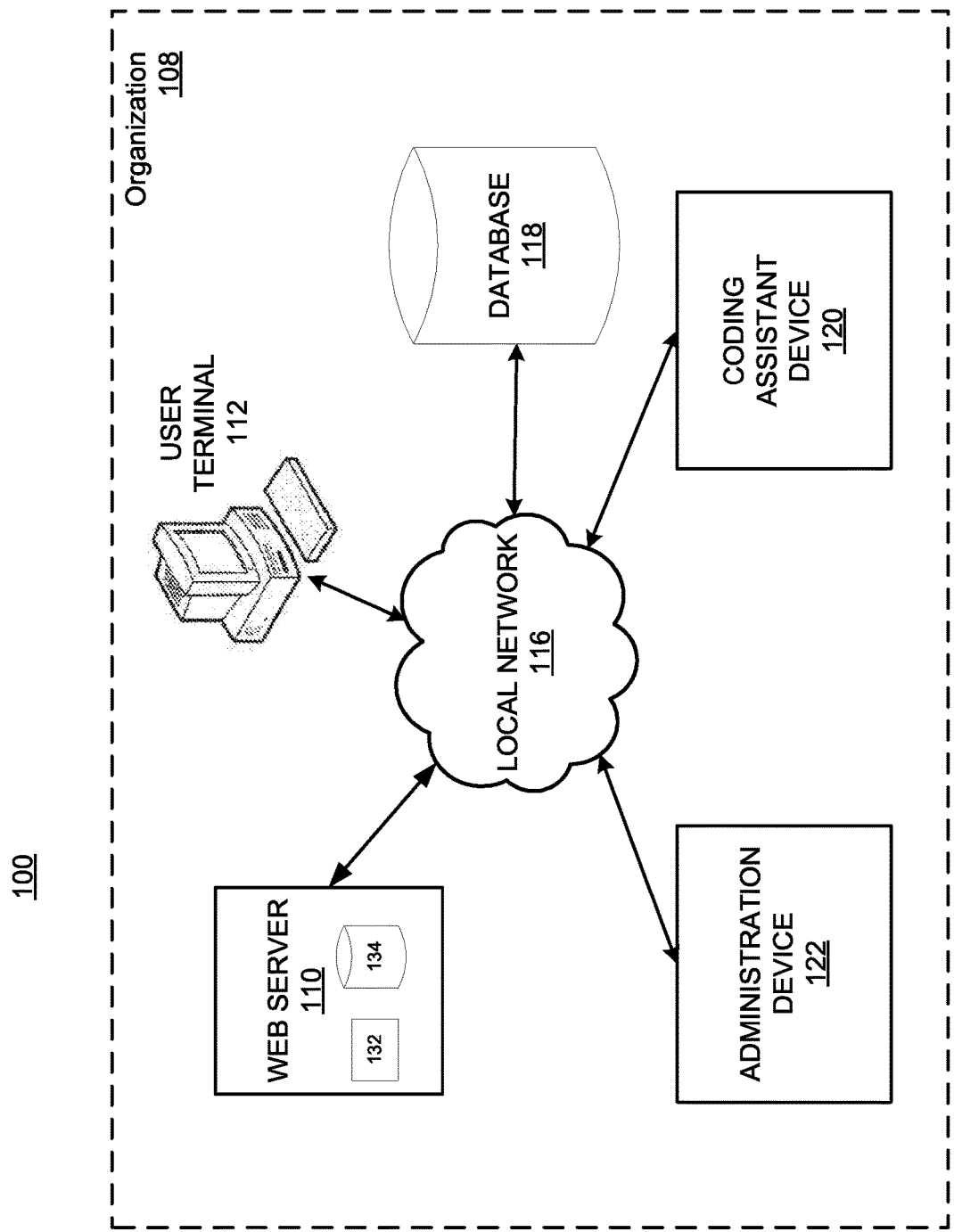
FIG. 1 is a diagram of an exemplary system that may be used for identifying experts in response to user requests.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Various embodiments of the present disclosure relate to systems for building a database for identifying experts. In some embodiments, the systems and methods can scrape and analyze a code repository storing coding scripts to identify coding techniques within the coding scripts. Various embodiments of the present disclosure relate to systems and methods of automatically identifying experts. In some embodiments, the systems and methods can automatically generate requests for an expert recommendation as a user is drafting a script. This automatic nature of the system may enhance the accessibility of information and improve processing speed and accuracy of the computer systems involved. Various embodiments of the present disclosure relate to systems and methods for building a library of coding techniques and updating the library as additional experts are identified within the organization. Having an up-to-date library of coding techniques that is self-regulating can improve the accessibility to information and improve processing speed and accuracy of the computer systems involved. This can also enhance the storage capabilities of the library and streamline searching for experts. Various embodiments of the present disclosure relate to systems and methods for facilitating reporting expertise of new experts to an organization and automatically update the expertise of the experts as the experts draft coding scripts for the organization.

Although the above embodiments are described with respect to systems, it is contemplated that embodiments with identical or substantially similar features may alternatively be implemented as methods and/or non-transitory computer-readable media.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that may provide automatic identification of experts in response to user requests. The components and arrangements shown in FIG. 1 are not intended to limit the disclosed embodiments as the components used to implement the disclosed processes and features may vary. As shown, system 100 may be implemented in organization 108 and may include, for example, a web server 110, user terminal 112, a local network 116, a database 118, a coding assistant device 120, and an administration device 122. While the below-described embodiments are discussed with reference to drafting algorithms (e.g., machine-learning algorithms) or other computer coding techniques, it is contemplated that the systems and methods for identifying experts can be made in other contexts.

Organization 108 may be associated with an entity such as a business, corporation, individual, partnership, or any other entity that provides one or more goods, services, or consultations to individuals, such as customers. Organization 108 may employ a plurality of employees performing a variety of roles in the organization. Of those employees, organization 108 may employee a variety of experts in various areas of expertise who either gathered the requisite knowledge from experience within organization 108 or from outside organization 108.

Organization 108 may include one or more servers, devices, and computer systems for performing one or more functions associated with products and/or services that organization 108 provides. Such servers, devices, and computer systems may include, for example, web server 110, user terminal 112, local network 116, database 118, coding assistant device 120, and administration device 122. The servers, devices, and computer systems of organization 108 may interact in a dynamic fashion to provide for automatic identification of experts in response to user requests.

Web server 110 may include a computer system configured to generate and provide one or more websites accessible to individuals involved in organization 108's normal operations. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices of system 100. According to some embodiments, web server 110 may receive communications from users, such as inquiries regarding recommendations for one or more experts. For example, in some embodiments, web server 110 may receive a message inquiry requesting an expert in an area of coding (e.g., machine-learning) from, for example, user terminal 112. In other embodiments, information stored on web server 110 may be accessed (e.g., retrieved, updated, and added to) via local network 116 by one or more device (e.g., a user terminal 112, database 118, coding assistant device 120, and administration device 122) of system 100.

User terminal 112 may include, but is not limited to, a terminal, a desktop computer, a laptop computer, a mobile device, such as a smart phone or tablet device, and any other computerized devices configured to communicate with local network 116 to perform various functions relating to organization 108. As discussed in more detail below (e.g., FIG. 2), user terminal 112 may include at least one processor and at least one memory storing computer code that when executed permits user terminal 112 to perform a variety of processing steps in response to user inputs, such as, for example, drafting coding scripts and executing the algorithms contained within the coding scripts, displaying a user interface for researching experts, generating query requests for expert recommendations, interacting with one or more of web server 110, database 118, coding assistant device 120, and administration device 122 over network 116, and dynamically displaying expert recommendations, all discussed in more detail below.

The user terminal 112 may be configured to facilitate drafting coding scripts and executing the algorithms contained within the coding scripts. In some embodiments, an employee may operate user terminal 112, and the employee may include any individual employed by organization 108 or involved in the operations of organization 108 including, for example, a computer engineer, a data analyst, a software engineer, a technology specialist, software developer, or a programmer. Additionally, in some embodiments organization 108 may include a plurality of user terminals 112 and employees. In some embodiments, user terminal 112 may enable a user to draft and test a plurality of coding scripts in different language and environments. For instance, user terminal 112 may store a plurality of software platforms on which the user may draft coding scripts and through which the user may test the plurality of coding scripts. These software platforms may be, for example, Java or Python, and incorporate one or more Open-Source frameworks or tools (e.g., TensorFlow, Keras, SciKit-Learn, Edward), including their respective language versions (e.g., Python 2.7 versus Python 3.4) and tool versions (e.g., SciKit-learn 1.0 versus SciKit-learn 2.0). In some embodiments, coding scripts may be from non-opensource frameworks or tools (e.g., SAS, SPSS).

In some embodiments, user terminal 112 may be configured to facilitate automatic identification of experts (e.g., display a user interface to the user through which the user may submit one or more user requests). In some embodiments, the user interface may be provided by an expert identification module stored on the memory user terminal 112 or otherwise in communication with user terminal 112. For instance, the expert identification module may be a separate device, or the expert identification module may be stored on coding assistant device 120.

Expert identification module may include software configured to provide expert recommendations to a user of user terminal 112 via the user interface. In some embodiments, expert identification module may establish a link between user terminal 112 and one or more of web server 110, database 118, coding assistant device 120, and administration device 122 via network 116 to permit user device to access (e.g., retrieve, update, or add to) information from web server 110, database 118, coding assistant device 120, and administration device 122.

Expert identification module may facilitate, via the user interface, generation of search queries or requests and providing one or more expert recommendations for display via user terminal 112. In some embodiments, the user interface may include a search field in which a user may input one or more search terms or phrases. In some embodiments, the user interface may include an upload field in which a user may upload a document (e.g., a document containing text). In some embodiments, the user interface may include one or more fields for defining search parameters. For instance, the search parameters may include parameters for search results (e.g., time frame of when coding script was drafted, number of coding scripts drafted, coding technique classification, a number of lines of code drafted by an expert, the number of times the coding script was updated, the number of collaborators, the number of lines removed for instance to optimize the code). In some embodiments, the fields may be selectable options for defining search parameters (e.g., boxes to check) delineating one or more predetermined search parameters. In other embodiments, the search function of the expert identification module may allow for manual entry of search parameters, such as via a Boolean search. In some embodiments, the user interface can facilitate API calls where the user can input desired parameters via user terminal 112. For instance, the user interface can facilitate an API call to database 118.

In some embodiments, the user interface can allow the user to weigh certain search terms. For instance, the user may assess weights to certain coding skills or experts of which they are more interested in. In some embodiments, the user interface can allow the user to select main criteria (e.g., required criteria) and preferred criteria (e.g., optional criteria). For instance, the user may specify that they would like an expert in Random Forest as the main criteria, but would prefer someone with experience in Sci-Kit. In some embodiments, the user interface can recommend alternative experts with related expertise in a coding technique similar to the coding technique of interest to the user. For instance, the expert identification module may use collaborative filtering for how many coding technique categories or skillsets that are shared with an alternative expert and provide the alternative experts to the user interface for display to the user. In some embodiments, the user interface may display a ranking based on proximity of the recommended expert to the search parameters specified for the user.

The search parameters may include a variety of information for identifying optimal expert recommendations. In some embodiments, the search parameters may include a preferred time frame or range for when an expert drafted coding documents. For instance, this search parameter may ask the system to return only experts who drafted coding documents within the designated time frame or range (e.g., return all experts who drafted coding scripts between Jan. 1, 2015 and Jan. 1, 2018 or after Dec. 31, 2016). In some embodiments, the search parameters may include a number of coding scripts drafted by the expert. For instance, this search parameter may ask the system to return only experts who drafted coding scripts exceeding a specified number or within a specified range (e.g., return all experts who drafted at least 20 coding scripts). In some embodiments, the search parameters may include a coding technique classification. For instance, this search parameter may ask the system to return only experts who drafted coding scripts of a certain type (e.g., return all experts who have drafted a linear regression algorithm), utilized certain techniques, addressed certain problems, or used certain languages. In some embodiments, the search parameters may include a number of lines of code drafted by the expert. For instance, this search parameter may ask the system to return only experts who drafted a specified number of coding lines or within a specified range of coding lines (e.g., return all experts who drafted at least 1000 lines of code). Those skilled in the art would understand that the system can accommodate combinations of the parameters designated above. Additionally, as discussed in more detail below, such parameters can correspond to information stored in database 118 in association with an expert library generated by the system (e.g., via coding assistant device 120).

In some embodiments, expert identification module may return search results in response to a search query. In embodiments where the user uploads a document, expert identification module may receive the document and analyze it to identify the text, determine what types of coding techniques/approaches are contained within the text, and send the text to database 118, e.g., as a text string. In embodiments where the user enters a search query, expert identification module may forward the search query to database 118. Expert identification module may then provide names via the user interface of recommended experts and additional information regarding the experts received from database 118. As non-limiting examples, the additional information may include a number of coding scripts drafted by the expert, links to example code drafted by the expert, contact information for the expert, one or more coding techniques the expert specializes in, or a time frame of when the expert drafted a particular coding script. In some embodiments, the user interface may include an input to assign an expert to a team. For instance, the user interface may display a selectable option (e.g., a button or link) establishing a communication link between the user and the expert via a plurality of channels (e.g., email, video chat, or chat interface). For instance, upon receiving indication of a user selecting the link, the user interface may display a window (e.g., a chat window or an email message) in which the user can contact the expert.

In some embodiments, user terminal 112 may be configured to dynamically display one or more expert recommendations as the user is drafting a program. In some embodiments, user terminal 112 may automatically generate a request for an expert recommendation as a user is drafting a document and dynamically display the recommendation to the user. For instance, as the user is drafting a portion of a coding script, expert identification module may determine a coding technique classification of the draft script by parsing text of the coding script for one or more functions within the first text. For example, language processing can be used to parse a coding script and compare the text to a coding technique library (discussed in more detail below) storing coding techniques and representative language associated with the coding techniques (e.g., as a bag-of-words model). In some cases, the language processing may include performing natural language processing on notes maintained in the document to identify a coding technique used therein. In some cases, string comparison against other techniques recorded in database 118 can be used. For instance, in some embodiments, the Levenshtein distance may be used to provide a confidence interval to the user of how close a search result matches the search query. After determining a coding technique classification, the expert identification module may send a query to database 118 instructing database 118 to search an expert library for an expert with experience with drafting coding scripts with the coding technique classification. After receiving recommendations from database 118, expert identification module may dynamically display the recommendation to the user of user terminal 112 in a display window.

In some embodiments, user terminal 112 may automatically generate a request for an expert recommendation as a user is testing the coding technique (e.g., machine-learning algorithm). For instance, a user may test a portion of a machine-learning algorithm and encounter an error message. Once the error message is received, expert identification module may determine a coding technique classification of the draft script by parsing text representative of the machine-learning algorithm, for example, similar to as discussed above. After determining a coding technique classification, the expert identification module may send a query to database 118 instructing database 118 to search an expert library for an expert with experience with drafting coding scripts with the coding technique classification. After receiving recommendations from database 118, expert identification module may dynamically display the recommendation to the user of user terminal 112 in a display window.

In some embodiments, the software platform may be enabled with a plug-in that integrates the expert identification module and allows the expert identification module to provide one or more expert recommendations while the user is drafting a coding script. In some embodiments, the plug-in may be configured to dynamically display an expert recommendation. For instance, the plug-in may display the expert recommendation in a floating window, automatically generated in response to a predefined trigger event (e.g., detecting a coding technique within the coding script, a predetermined number of test runs occurring that returned an error). In other embodiments, the plug-in may display the expert recommendation without a predefined trigger event.

In some embodiments, expert identification module may update expertise of employees of organization 108 over time. For instance, in some embodiments, expert identification module may receive prior expertise of the employee before employment with organization 108 and store the relevant expertise of the employee in database 118. This may occur, for instance, during an on-boarding process when the employee selects or specifies expertise. Following employment of the employee at organization 108. Over time, as the employee drafts coding scripts, expert identification module may verify the expertise update the stored information in an expert library stored on database 118.

In some embodiments, user terminal 112 may be configured to display a chat user interface for requesting one or more expert recommendations. The chat user interface may be configured to display user messages and system messages. User messages may be messages that are generated in response to receiving text input by a user (e.g., a programmer entering a message into an input field) and system messages may be messages that are automatically generated by system 100 (e.g., via coding assistant device 120) in response to a user message, prompting the user to input a response, or simply providing the user with information. In some embodiments, the system messages may include the name of an expert, contact information for the expert (e.g., a telephone number, a telephone extension, an email address, an office number), the number of lines written by the expert, a link to one or more exemplary documents drafted by the expert relevant to the user request, the number of coding documents written by the expert, or the number of models used by the expert.

Database 118 may include one or more memory devices storing information associated with organization 108. For instance, database 118 may store a coding technique library, a coding expert library, and a repository of coding documents drafted by employees of organization 108.

Database 118 may include a coding technique library. The coding technique library may be generated and updated by coding assistant device 120. The coding technique library may include information regarding a plurality of coding techniques (e.g., examples, statistics, and representative data). In some embodiments, the plurality of coding techniques may be machine-learning techniques. The machine-learning techniques may include one or more of a nearest neighbor, naïve Bayes, decision trees, linear regression, support vector machines, neural networks, k-means clustering, association rules, Q-learning, temporal difference, deep adversarial networks, decision tree, random forest, and gradient boosting machines. However, these are merely examples, and various known or future developed coding techniques may be referenced in the coding technique library. These machine-learning techniques may be identified from a plurality of sources by coding assistant device 120 including, but not limited to, by scraping a plurality of coding scripts stored on database 118 and drafted by employees of organization 108 over time, by searching coding repositories (e.g., via web server 112), or by updates provided by administration device 122. In some embodiments, the coding technique library may include links to documents drafted by employees of organization 108 classified as including a particular coding technique, text strings including words and phrases representative of the coding technique library obtained from documents drafted by employees of organization 108 or based on searches conducted by employees of organization 108, and experts in the particular coding techniques.

In some embodiments, a person may be classified as an expert based on the number of coding scripts or lines of code drafted by the person and classified as a particular coding technique. For instance, a person may be classified as an expert in drafting linear regression algorithm if the person has drafted 20 coding scripts including a linear regression algorithm. In some embodiments, a person may be classified as an expert based on the number of coding scripts or lines of code drafted by the person classified as a particular coding technique and within a period of time. For instance, a person may be classified as an expert in drafting linear regression algorithm if the person has drafted 20 coding scripts including a linear regression algorithm within the past year.

Database 118 may include an expert library. The expert library may be generated and updated by coding assistant device 120. In some embodiments, the expert library may include a plurality of experts identified in the organization, as discussed above. For each expert in the library, the expert library may include, as non-limiting examples, a number of lines of code drafted by that expert for a particular coding technique, a number of coding scripts drafted by that expert for a particular coding technique, links to coding documents drafted by the expert, contact information for the expert, and one or more coding technique classifications in which the expert has specific expertise. In some embodiments, database 118 may store a record storing the number of people who have contacted a particular expert for advice. For instance, in some embodiments, coding assistant device 120 may ask users if they have contacted a particular expert, and if they reply yes, then the expert library will make a record that the user contacted the expert. In some embodiments, database 118 may store frequent collaborators or co-authors with whom the expert works.

Coding assistant device 120 may include a computer system configured to generate and maintain a database of coding techniques practiced by the organization and respective expert information, receive requests for expert recommendations, and provide expert recommendations to users accessing user terminal 112. In some embodiments, coding assistant device 120 may be configured to select an expert recommendation based on a most-recent date when the expert drafted a corresponding coding technique.

In some embodiments, coding assistant device 120 may be configured to generate the coding technique library and the expert library associated with the organization. The coding technique library may include a plurality of coding techniques, their respective author or authors, links to one or more documents including coding techniques drafted by their respective author or authors, a bag of words of terms associated with the coding technique, and a function performed by the respective coding techniques.

In some embodiments, coding assistant device 120 may be configured to scrape an internal repository (e.g., Github) storing coding scripts drafted by employees associated with organization 108. In some embodiments, coding assistant device 120 may be configured to scrape the internal repository to determine if the documents contain a coding script, to identify one or more authors of the coding script, to identify a number of lines in the coding document, and to identify a date of the coding script. In some embodiments, coding assistant device 120 may determine if the document contains a coding script based on document extensions. In some cases, coding assistant device 120 may parse text of the coding script for one or more functions within the first text using one or more natural language processing techniques and determine a coding technique classification of the coding script by comparing the identified functions to those provided to system. In some embodiments, coding assistant device 120 may identify one or more authors of the coding script and a date based on information stored in association with the coding document. In some embodiments, after coding assistant device 120 identifies a coding script, coding assistant device 120 may generate the coding technique library.

In some embodiments, coding assistant device 120 may be configured to update the coding technique library. In response to identifying a new coding script using a repository crawler and/or a repository scraper, coding assistant device 120 may parse the new coding script to identify a coding technique used therein, and determine if the coding technique already exists in the coding technique library. If a coding technique does not exist, then coding assistant device 120 may create a bag-of-words model from the parsed data that pertains to the coding technique. Those skilled in the art would understand that a bag-of-words model can include a text string of individual words or phrases of the document. For instance, in an embodiment where the coding technique is a machine-learning technique, the bag of words model may include epochs, trains, predicts, neighbors, iterations, or trees. Coding assistant device 120 may then update the database 118 as a new record of a machine-learning technique including the author of the technique and the bag of words. Coding assistant device 120 may run a prediction model to see if there were any coding techniques that were undetected in the identified new coding document. If other coding techniques were detected, an administration device 122 can be notified and verify if coding technique exists. If administration device 122 identifies another coding technique, then the administration device may instruct coding assistant device 120 to update the coding technique library.

In some embodiments, coding assistant device 120 may be configured to generate one or more expert recommendations to provide to a user accessing user terminal 112. In response to receiving a request for an expert recommendation, coding assistant device 120 may access (e.g., retrieve, update, or add to) database 118. For instance, coding assistant device 120 may send a search query received from user terminal 112 to database and receive one or more expert recommendations in response to the search query. In embodiments where coding assistant device 120 receives text associated with a draft coding technique, coding assistant device 120 may request recommendations with a certain match threshold. Because coding scripts may be drafted differently from one user to another and from one application to another (even for a same technique), the text of one script might not be an exact match to the text of another script. Therefore, in some embodiments, coding assistant device 120 may instruct database 118 to return expert recommendations having a percentage match above a threshold. For instance, coding assistant device 120 may instruct database 118 to return expert recommendations for experts in linear regression techniques having a percentage text match of 75%. In some embodiments, the threshold may be established by the user of user terminal 112 as part of the search or may be predetermined by coding assistant device 120.

In some embodiments, coding assistant device 120 may be configured to generate one or more links to coding documents authored by an expert identified by coding assistant device 120 and provide the one or more links for display via the user interface of user device 112 in association with the expert recommendation. In some embodiments, coding assistant device 120 may be configured to determine a respective number of coding scripts authored by an expert identified by coding assistant device 120 and provide the respective number of coding scripts for display via the user interface of user device 112 in association with the expert recommendation.

In some embodiments, coding assistant device 120 may be configured to generate alternative expert recommendations associated with alternative coding techniques that achieve the same or a similar function. For instance, coding assistant device 120 may identify a coding technique in a draft algorithm being drafted by a user accessing user device 112. Coding assistant device 120 may then compare the identified function to a library storing a variety of coding scripts and respective functions performed by the coding scripts within the library. Coding assistant device 120 may then identify a respective coding script having the same or a similar function as that identified from the draft algorithm.

Network 116 may be of any suitable type, including individual connections via the Internet such as cellular or WiFi™ networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 116 may include any type of computer networking arrangement used to exchange data. For example, network 116 may be the Internet, a private data network, virtual private network using a public network, and/or other suitable connection(s) that enables components in system environment 100 to send and receive information between the components of system 100. Network 116 may also include a public switched telephone network ("PSTN") and/or a wireless network.

The steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high level code that can be executed by a processor using an interpreter.

Figure 2:
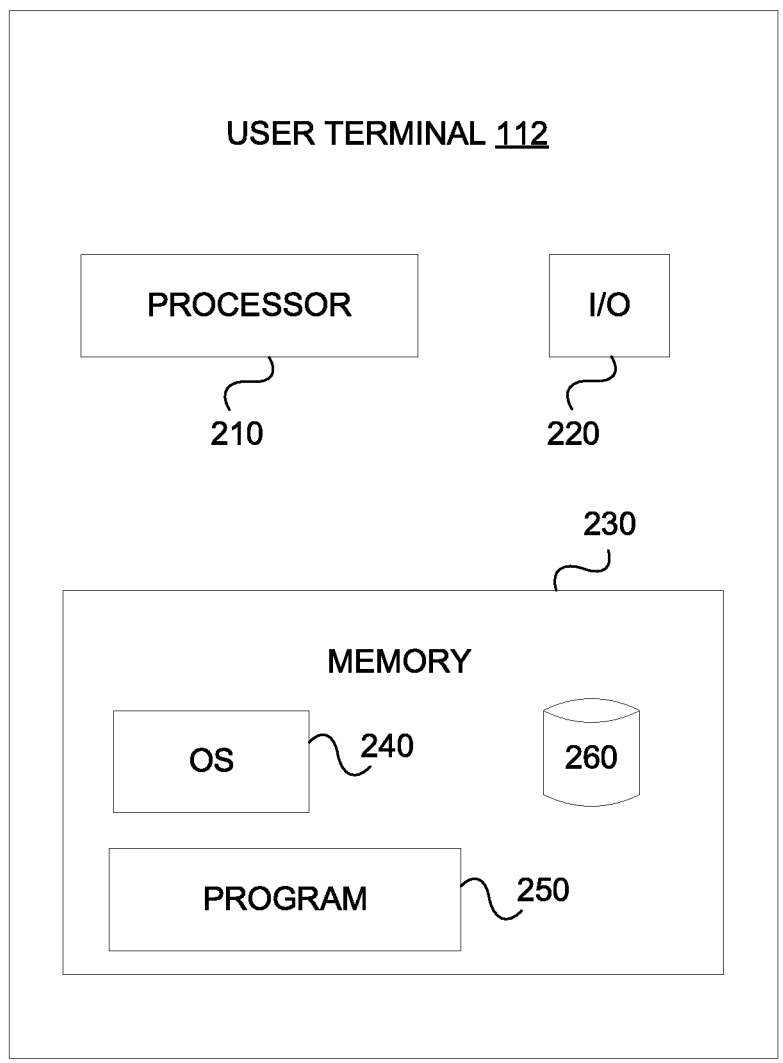
FIG. 2 is a component diagram of an exemplary user terminal.

An exemplary embodiment of user terminal 112 is shown in more detail in FIG. 2. Web server 110, a local network 116, a database 118, a coding assistant device 120, and administration device 122 may have a similar structure and may include many components that are similar to or even have the same capabilities as those described with respect to user terminal 112 as shown in FIG. 2. As shown, user terminal 112 may include a processor 210, an input/output ("I/O") device 220, a memory 230 containing an operating system ("OS") 240 and a program 250. For example, user terminal 112 may be a single device or server or may be configured as a distributed computer system including multiple servers, devices, or computers that interoperate to perform one or more of the processes and functionalities associated with the disclosed embodiments. In some embodiments, user terminal 112 may further include a peripheral interface, a transceiver, a mobile network interface in communication with the processor 210, a bus configured to facilitate communication between the various components of user terminal 112, and a power source configured to power one or more components of user terminal 112.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

User terminal 112 may include one or more storage devices configured to store information used by processor 210 (or other components) to perform certain functions related to the disclosed embodiments. In some embodiments, user terminal 112 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, user terminal 112 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, user terminal 112 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may a database 260 for storing related data to enable user terminal 112 to perform one or more of the processes and functionalities associated with the disclosed embodiments.

User terminal 112 may also be communicatively connected to one or more memory devices (e.g., databases) locally or through a network. The remote memory devices may be configured to store information and may be accessed and/or managed by user terminal 112. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

User terminal 112 may also include one or more I/O devices 220 that may include one or more interfaces for receiving signals or input from devices and providing signals or output to one or more devices that allow data to be received and/or transmitted by user terminal 112. For example, user terminal 112 may include interface components, which may provide interfaces to one or more input devices, such as one or more keyboards, mouse devices, touch screens, track pads, trackballs, scroll wheels, digital cameras, microphones, sensors, and the like, that enable user terminal 112 to receive data from one or more users (such as, for example, via user device 102).

In exemplary embodiments of the disclosed technology, user terminal 112 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Figure 3:
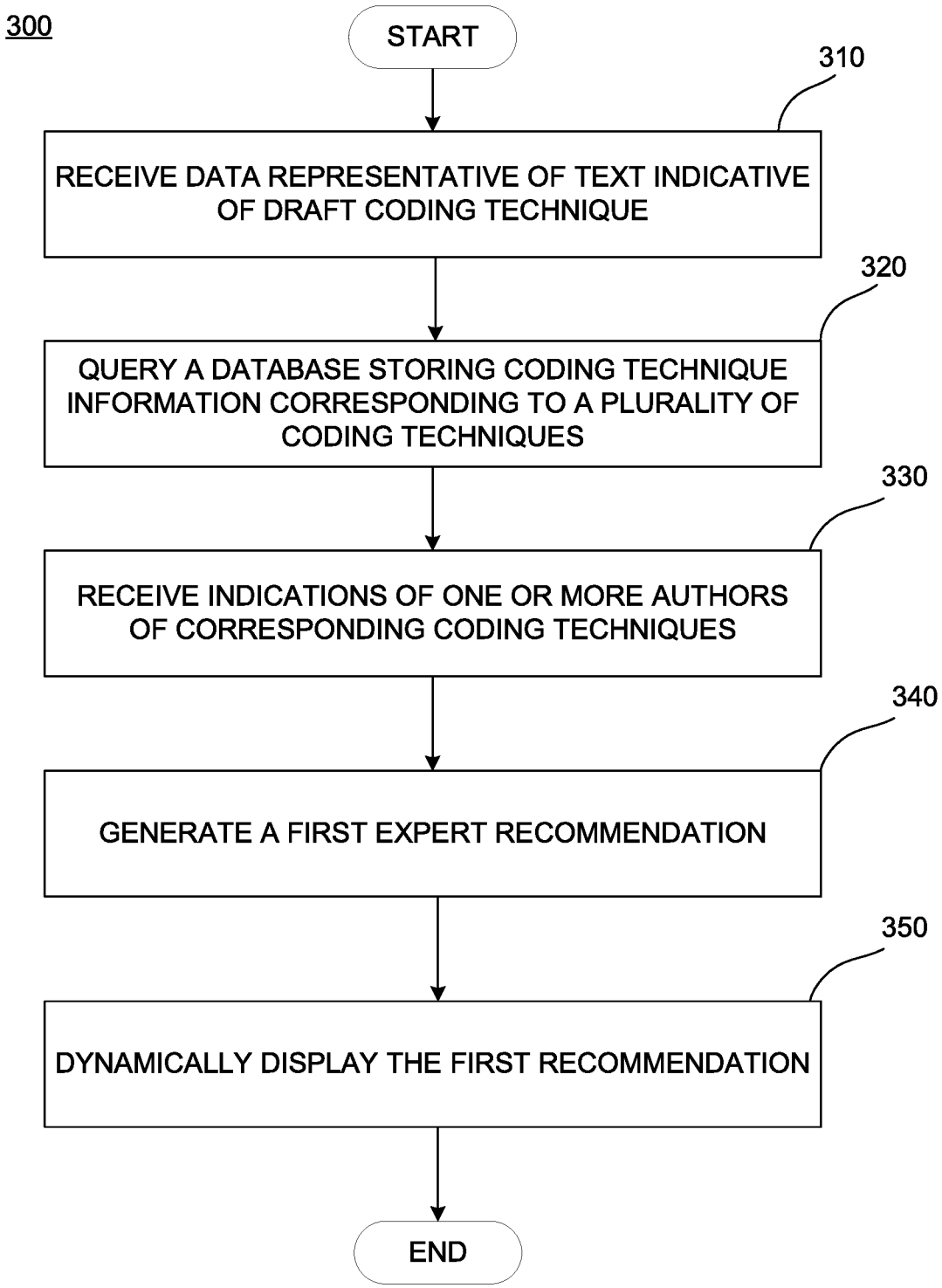
FIG. 3 is a flowchart of an exemplary method that may be used for identifying experts in response to user requests.

FIG. 3 shows a flowchart of a method 300 for automatically providing expert recommendations. Method 300 may be performed by a system including some or all of web server 110, user terminal 112, local network 116, database 118, coding assistant device 120, and administration device 122.

In block 310, the system (e.g., via user terminal 112) may receive data representative of text indicative of a draft coding technique. According to some embodiments, the draft coding technique can be a draft machine-learning algorithm, but this is merely an example. In some cases, the text may be indicative of a plurality of coding techniques, either isolated or overlapping. According to some embodiments, the user can be drafting the coding technique as the system is receiving the text representative of the draft coding technique. For example, a user of user terminal 112 may input text and the system may be processing the text for use in accordance with the system as the user is typing. According to some embodiments, the system may receive the data representative of text indicative of a draft coding technique via a user interface generated by coding assistant device 120 for display via user terminal 112. For instance, in some embodiments, the user may upload a document containing the text via the user interface and the system may download the document and parse the text using one or more natural language processing techniques. In some embodiments, the user may type or copy text into a search field of the user interface and select a search button and the system may parse the text using one or more natural language processing techniques. In some embodiments, in addition to the data representative of text indicative of the draft coding technique, the system (e.g., via user terminal 112) may receive one or more search parameters which may include a time frame of when the coding script was drafted, number of coding scripts drafted, or coding technique function performed.

In block 320, the system (e.g., via coding assistant device 120) may query a database (e.g., database 118) storing coding technique information corresponding to a plurality of coding techniques. According to some embodiments, the query sent to database 118 may include a request for a coding technique classification of the coding technique. For instance, the function of the coding technique may be a machine-learning classification algorithm (e.g., nearest neighbor, naïve Bayes, decision trees, linear regression, support vector machines, neural networks, k-means clustering, association rules, Q-learning, temporal difference, deep adversarial networks). According to some embodiments, the query sent to database 118 may include coding technique type identified by coding assistant device 120 based on the text indicative of the draft coding technique. For instance, coding assistant device 120 may receive the data representative of text indicative of a draft coding technique from user terminal 112 and parse the text using one or more natural language processing techniques. In some embodiments, parsing may include identifying one or more key words or phrases from the text and comparing the words or phrases to a coding technique library stored on database 118. In some embodiments, the coding technique library may include a plurality of coding technique types associated models (e.g., bag-of-words models) identified from past-drafted coding scripts from the organization or from coding scripts obtained from the web. For instance, coding assistant device 120 may determine that the coding technique is a linear regression technique by using natural language processing to identify the words used in the coding technique and comparing the identified words to words or phrases commonly employed in a linear regression coding script stored in the library.

At block 330, the system (e.g., via coding assistant device 120) can receive indications of one or more authors of corresponding coding techniques from database 118. According to some embodiments, the system may receive indications of one or more authors responsive to identification of a first coding technique classification within database 118. For instance, in some embodiments, after receiving the query from coding assistant device 120, database may parse a coding expert library including a plurality of coding experts identified by coding assistant device 120 and added to the library. In some embodiments, coding expert library may include a plurality of coding experts, a respective type of coding technique in which each coding expert may be an expert, a number of lines of code written in that respective type, a number of coding documents written containing the respective type, and a date of the last coding document drafted of that respective type.

At block 340, the system (e.g., via coding assistant device 120) can generate a first expert recommendation and at block 350, the system can dynamically display the first recommendation to the user (e.g., via user terminal 112). In some cases, the first recommendation may change as the user modifies the coding script (e.g., thus changing a best-fit coding technique). According to some embodiments, the system (e.g., via coding assistant device 120) may be configured to generate links to one or more coding documents authored by the first expert and provide one or more links to the coding documents (e.g., displayed with the first recommendation). According to some embodiments, the system (e.g., via user terminal 112) can be configured to display the first recommendation in a floating window. According to some embodiments, the first expert recommendation may be generated based on a respective number of coding scripts authored by the first expert. For instance, the system may choose to display the top three experts based on number of coding scripts authored. According to some embodiments, the first expert recommendation may be generated based on a respective number of lines of code authored by the first expert. For instance, the system may choose to display the top three experts based on lines of code authored. According to some embodiments, the first expert recommendation may be generated based on a respective date of when the expert drafted a coding technique corresponding to that searched for. For instance, the system may choose to recommend one expert over another based on who drafted a coding technique of interest most recently. According to some embodiments, the system may be configured to identify an alternative coding technique performing a same or similar function to that searched for. For instance, coding assistant device 120 may determine the alternative coding technique based on coding technique classification and associated text from coding documents classified with a corresponding coding technique classification.

Figure 4:
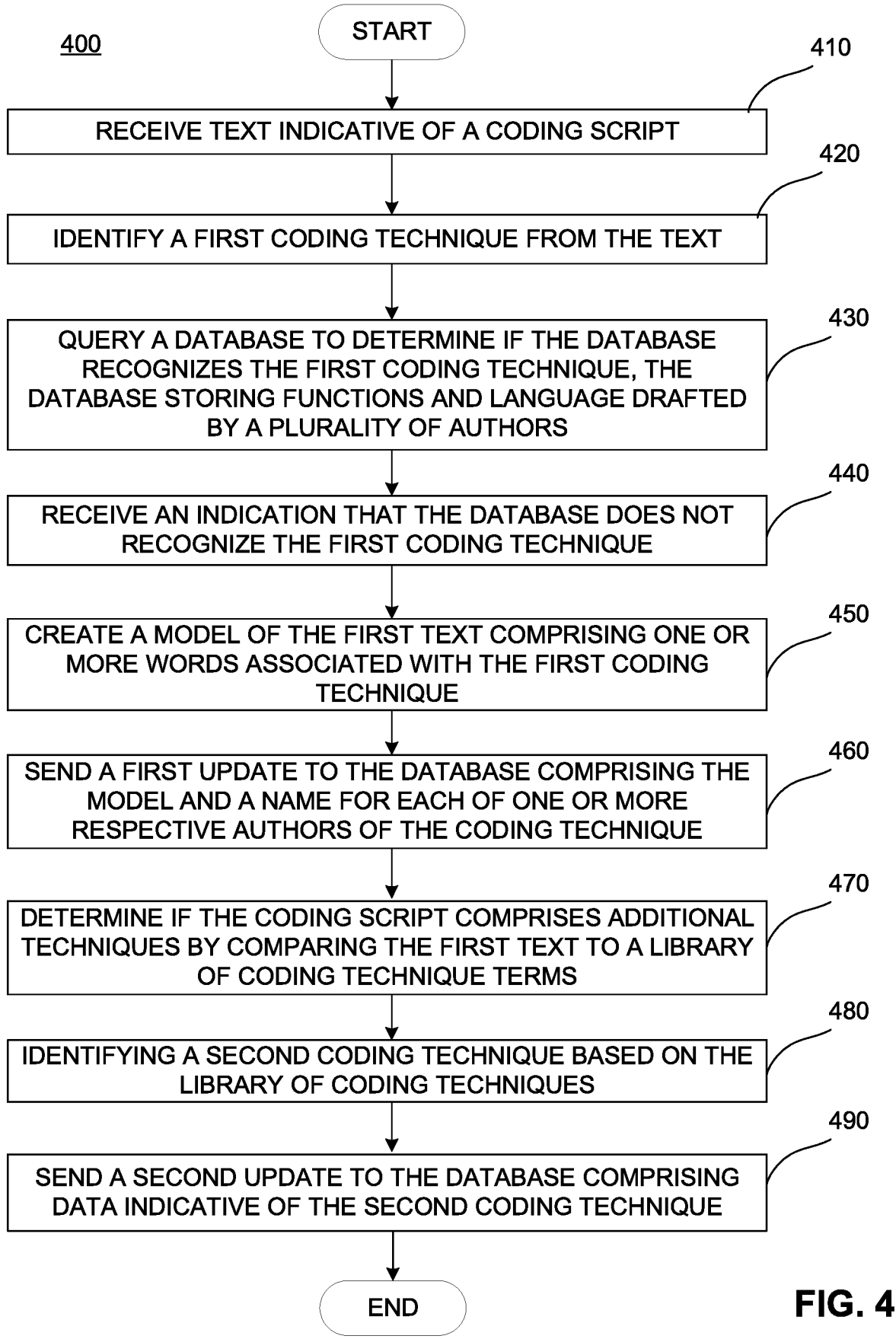
FIG. 4 is a flowchart of an exemplary method that may be used for identifying experts in response to user requests.

FIG. 4 shows a flowchart of a method 400 for automatically providing expert recommendations. Method 400 may be performed by a system including some or all of web server 110, user terminal 112, local network 116, database 118, coding assistant device 120, and administration device 122.

At block 410, the system (e.g., via user terminal 112) may receive text indicative of a coding script. According to some embodiments, the draft coding technique can be a draft machine-learning algorithm and can include a plurality of coding techniques. According to some embodiments, the user can be drafting the coding technique as the system is receiving the text representative of the draft coding technique. For example, a user of user terminal 112 may input text and the system may be processing the text for use in accordance with the system as the user is typing. According to some embodiments, the system may receive the data representative of text indicative of a draft coding technique via a user interface generated by coding assistant device 120 for display via user terminal 112. For instance, in some embodiments, the user may upload a document containing the text via the user interface. For instance, in other embodiments, the user may type or copy text into a search field of the user interface and select a search button and the system may parse the text to isolate a coding script (or a portion of a coding script) from within the document. In some embodiments, in addition to the data representative of text indicative of the draft coding technique, the system (e.g., via user terminal 112) may receive one or more search parameters which may include a time frame of when the coding script was drafted, number of coding scripts drafted, or coding technique function performed.

At block 420, the system (e.g., via coding assistant device 120) may identify a first coding technique from the text. According to some embodiments, the system may identify the coding using one or more natural language processing techniques (e.g., on the coding script or notes of the coding script) and compare the identified text to text stored in association with one or more coding techniques stored in a coding technique library, such as that discussed above. In some embodiments, where the user uploads a file including the text, the system may download the file and identify the text using one or more natural language processing techniques.

At block 430, the system (e.g., via coding assistant device 120) may query a database (e.g., database 118) to determine if the database recognizes the first coding technique, the database storing a plurality of coding technique classifications and information representative of coding scripts drafted by a plurality of authors. In some embodiments, the text representative of language drafted by the plurality of authors may include a text model (e.g., a bag-of-words model) including a text string of words corresponding to the coding technique.

At block 440, the system (e.g., via coding assistant device 120) may receive an indication that the database does not recognize the coding technique. For example, this may occur where coding assistant device 120 has not identified a particular coding technique from a repository of coding techniques drafted by members of an organization over time.

At block 450, the system (e.g., via coding assistant device 120) may create a model of the first text including one or more words associated with the coding technique. According to some embodiments, the model may be a bag-of-words including a text string of words from the coding techniques. In some embodiments, the system may create a string comparison (e.g., using the Levenshtein distance).

At block 460, the system (e.g., via coding assistant device 120) may send a first update to the database including the model and a name for each of one or more respective authors of the coding script. According to some embodiments, coding assistant device 120 may additionally send as part of the first update to the database, a coding technique classification associated with one or more coding techniques identified in the coding script, the number of lines in each identified coding technique or the coding script, and a date of drafting the coding script. In some embodiments, coding assistant device 120 may determine the coding technique classification by comparing the model to a coding technique library storing a plurality of coding technique types and corresponding exemplary text.

Figure 5:
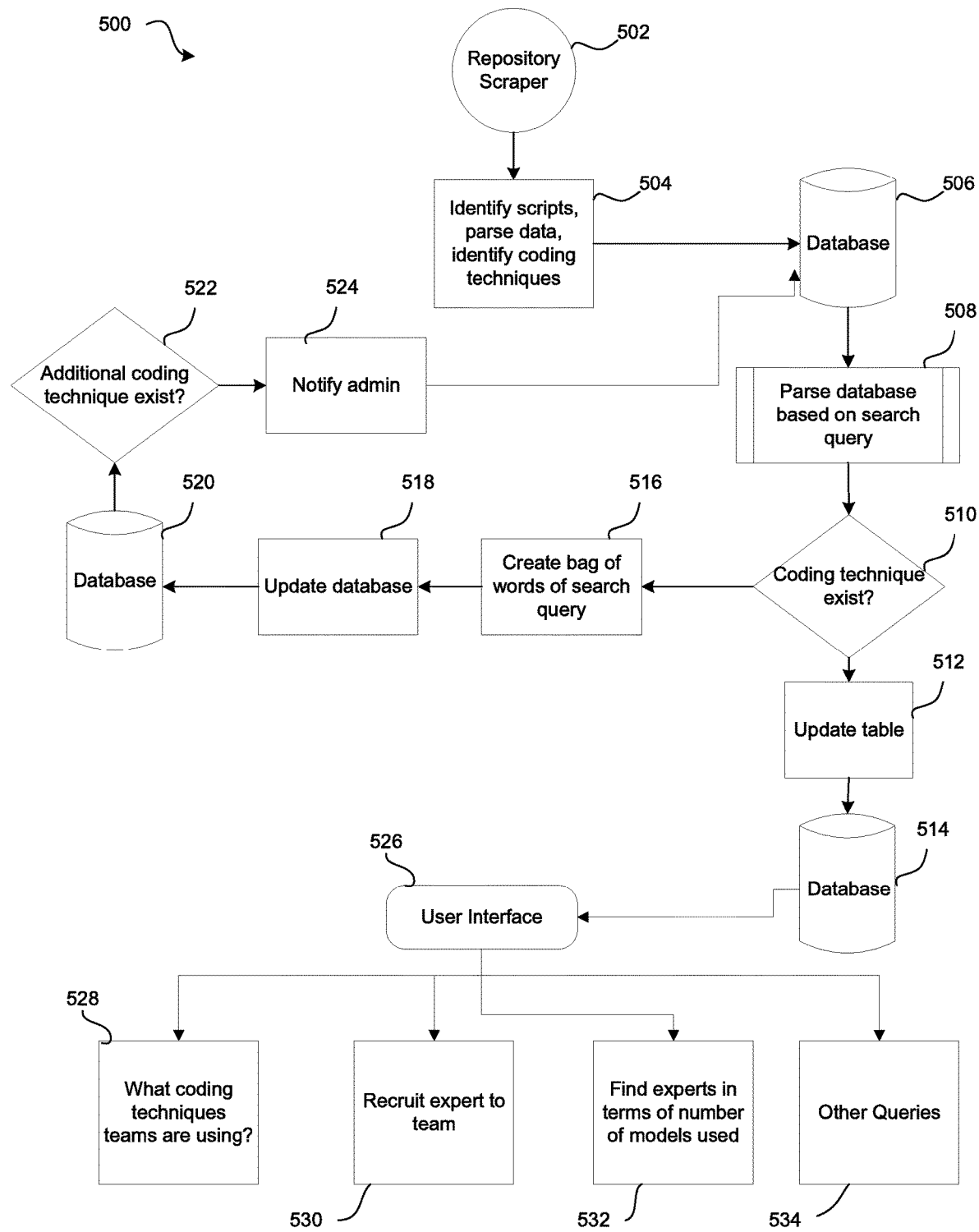
FIG. 5 is a flowchart of an exemplary system that may be used for identifying experts in response to user requests.

At block 470, the system (e.g., via coding assistant device 120) may determine if the coding script includes additional techniques by comparing the first text to the coding technique library, as described above. At block 480, the system (e.g., via coding assistant device 120) may identify a second coding technique in based on the library of coding techniques. At block 490, the system (e.g., via coding assistant device 120) may send a second update to the database including data indicative of the second coding technique FIG. 5 is a flowchart of an exemplary system 500 that may be used for identifying experts in response to user requests. In some embodiments, as illustrated at FIG. 5, the system may include a repository scraper 502 that may be configured to, as shown at block 504, scrape a repository to identify coding scripts containing coding techniques, parse the data within the scripts, and identify respective coding techniques within the scripts. In some embodiments, repository scraper 502 may be configured to identify coding scripts based on a document name stored in association with the coding script, a document description stored in association with the coding script and containing a description of the contents of the document, a document classification, a document sub-classification, or the text within the document. In some embodiments, the document description, the document classification, and the document sub-classification may be provided to the repository when an author uploads the document to the repository. In some embodiments, the repository scraper may be configured to identify if the document is a coding script by searching the document text for particular keywords. For instance, the particular keywords may include function identifiers, epochs, trains, predict, fit, transform, clusters, features or variables.

In some embodiments, once it is determined that a document contains a coding script, the repository scraper may store the document and information about the document in a database 506. In some embodiments, the information about the document may comprise specific coding techniques and representative language.

At block 508, the system may be able to receive search queries from a user and parse the data to determine if a certain coding technique exists in the database. In some embodiments, the search queries may be generated by a user via a user interface. In other embodiments, as discussed previously, the search queries may be automatically generated by an expert identification module. In some embodiments, the search query may comprise a coding technique classification. In other embodiments, the search query may comprise a coding script or excerpts of a coding script comprising a coding technique.

At block 510, if the system determines that the coding technique exists in the database 506, the system may update a table with a record of a user or drafter of the coding technique and the coding technique used and update database 514. At block 510, if the system determines that the coding technique does not exist in database 506, the system may create a bag of words of the search query at block 516. In some embodiments, creating the bag of words may comprise parsing the search query for language associated with the coding technique and creating a bag of words model comprising the words or phrases making up the coding technique. In some embodiments, where the coding technique is a machine-learning algorithm, the bag of words model may comprise epochs, trains, predictions, neighbors, iterations, or trees.

At block 518, the system may update database 506 with a new record of the coding technique and the bag of words. At block 522, the system may determine if an additional coding technique exists in the search query. For instance, the system may access database 520 storing a plurality of coding techniques and terms associated with the coding techniques and run a prediction model to determine if the search query contains additional coding techniques that were undetected.

At block 524, if other coding techniques are detected, the system may notify an administrator (e.g., administration device 122) to verify the additional coding technique, and once verified may update database 506.

At block 526, the system may comprise a user interface to enable a user to find useful information within an organization. The user interface may access database 514 to determine a variety of information such as what coding techniques teams are using (block 528), recruit an expert to a team (block 530), find experts in terms of the number of models used (block 532), or other queries (block 534) such as determining alternative coding techniques that perform a similar function. In some embodiments, the user interface can be utilized to monitor performance of individuals compared to peers, by for instance, storing information on the number of coding techniques drafted and tracking collaboration of the expert with other individuals in the organization.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Case

The following exemplary use cases describe examples of a typical user flow pattern. They are intended solely for explanatory purposes and are non-limiting. A programmer may be employed with an organization and tasked with drafting a machine-learning algorithm. The programmer may begin drafting a coding script of the machine-learning algorithm using a software drafting program installed on his company desktop computer (e.g., user terminal 112). The drafting program may include an expert identification module provided as a plug-in. As the programmer begins drafting the coding script, she may encounter issues either with compiling or executing the code, or in having the code execute (operate) as intended.

As the programmer is drafting the code, the system (e.g., via coding assistant device 120) may determine that the programmer is drafting a coding script including a machine-learning algorithm. For instance, the system may identify various words within the coding script (e.g., via coding assistant device 120) that correspond to a linear regression algorithm stored in a library of a database (e.g., database 118) associated with the organization. The linear regression algorithm may be identified using, for example, natural-language processing on portions of the coding script. The system (e.g., via coding assistant device 120) may then access records stored on the database (e.g., database 118) and generated by the organization over time including various coding experts employed in the organization. The system (e.g., via coding assistant device 120) may then identify one or more experts in linear regression algorithms and associated information regarding those experts. For instance, the system (e.g., via coding assistant device 120) may identify from the database a number of lines of code drafted by the expert and a number of coding scripts drafted by the expert. The system (e.g., via coding assistant device 120) may identify the experts (e.g., provide a user notice of particular experts) and/or provide links to coding scripts drafted by the expert or alternative coding scripts drafted by the expert.

In one case, the programmer may be drafting the code and decide to test the code. As the programmer is testing the code, she may receive an error message. The system (e.g., via coding assistant device 120) may receive a notification that the programmer received an error message and generate one or more expert recommendations.

What is claimed is:

1. A system comprising:
one or more processors; and
at least one memory storing computer code that, when executed by the one or more processors, is configured to cause the system to:
receive first data representative of first text indicative of a first draft machine learning coding script;
query a database storing coding technique information corresponding to a plurality of machine learning coding techniques and associated models identified from past machine learning coding scripts;
receive second data corresponding to one or more authors of corresponding one or more machine learning coding techniques of the plurality of machine learning coding techniques;
extracting the one or more machine learning coding techniques for each author of the one or more authors based on the second data;
identifying a first expert among the one or more authors associated with the extracted one or more machine learning coding techniques based on the first expert having used the most number of machine learning coding models among the one or more authors and possessing the most number of machine learning coding techniques;
generate a first recommendation comprising an identification of the first expert among the one or more authors; and
dynamically display the first recommendation.

2. The system of claim 1, wherein the computer code, when executed by the one or more processors, is further configured to cause the system to determine that the first draft machine learning coding script comprises a first function by:
parsing the first text to identify one or more functions within the first text; and
comparing each of the one or more functions to a library comprising a plurality of functions.

3. The system of claim 1, wherein the computer code, when executed by the one or more processors, is further configured to cause the system to:
receive an indication instructing the system to test the first draft machine learning coding script;
execute the first draft machine learning coding script; and
responsive to identifying one or more errors in the first draft machine learning coding script, output an error message and automatically generate a request to identify the first expert and query the database.

4. The system of claim 1, wherein the computer code, when executed by the one or more processors, is further configured to cause the system to:
generate links to one or more coding documents authored by the first expert; and
display the first recommendation in a floating window with the one or more links to coding documents.

5. The system of claim 1, wherein the computer code, when executed by the one or more processors, is further configured to cause the system to:
determine a respective number of machine learning coding scripts including the first draft machine learning coding script associated with each of the one or more authors; and
identify the first expert among the one or more authors based on the respective number of machine learning coding scripts.

6. The system of claim 1, wherein the computer code, when executed by the one or more processors, is further configured to cause the system to:
determine a respective number of lines of code associated with each one or more authors, the number of lines including lines of code in the first draft machine learning coding script; and
identify the first expert among the one or more authors based on the respective number of lines of code.

7. The system of claim 1, wherein the computer code, when executed by the one or more processors, is further configured to cause the system to:
analyze the first data representative of the first text as the first text is drafted to identify a first machine learning coding technique; and
automatically generate the first recommendation.

8. The system of claim 1, wherein generating the first recommendation comprises selecting the first expert from among the one or more authors based on a date representative of when the first expert drafted the corresponding machine learning coding technique.

9. The system of claim 7, wherein the computer code, when executed by the one or more processors, is further configured to cause the system to:

receive, responsive to an identification of a first function within the database, indications of an alternative machine learning coding technique performing a same function as the first machine learning coding technique;
generate a second recommendation comprising an identification of a second expert among the one or more authors, the second expert being associated with the alternative machine learning coding technique; and
dynamically display the second recommendation.

10. A system comprising:
one or more processors; and
one or more memory devices storing computer code that when executed by the one or more processors causes the system to:
receive a first text indicative of a first coding script;
responsive to identifying a first coding technique from the first text, query a database, using a first search query comprising the identity of the first coding technique, to determine if the database recognizes the first coding technique, the database storing coding technique classifications and language drafted by a plurality of authors;
responsive to receiving an indication that the database does not recognize the first coding technique, create a first model of the first text comprising one or more words associated with the first coding technique, wherein creating the first model further comprises parsing the first search query for language associated with the first coding technique and creating a first bag-of-words model of the first text comprising the one or more words associated with the first coding technique; and
send a first update to the database comprising the first model and an updated respective number of models used by each author of the first coding technique.

11. The system of claim 10, wherein the computer code, when executed by the one or more processors, is further configured to cause the system to:
determine if the first coding script comprises additional coding techniques by comparing the first text to a library of coding technique terms; and
responsive to identifying a second coding technique based on the library of coding technique terms, send a second update to the database comprising data indicative of the second coding technique;
scrape a repository to identify a plurality of scripts comprising a plurality of coding techniques;
identify one or more authors associated with each coding technique of the plurality of coding techniques based on information stored in the repository about the plurality of scripts; and
store data indicative of the plurality of coding techniques and the respective one or more authors in the database, wherein the first model of the first text is created in response to receiving an indication that the database does not recognize the first coding technique.

12. The system of claim 11, wherein at least one script of the plurality of scripts is a draft script.

13. The system of claim 12, wherein the computer code, when executed by the one or more processors, is further configured to cause the system to:
output, to an administration device, a request for verification that the additional coding techniques are of a particular type; and
send the second update responsive to receiving a verification from the administration device.

14. The system of claim 13, wherein receiving the first text comprises:
recognizing, from the first text, a first draft coding technique using one or more natural language processing techniques and comparing the first text to the library storing a plurality of coding techniques.

15. The system of claim 10, wherein the computer code, when executed by the one or more processors, is further configured to cause the system to:
parse the first text to identify the first coding technique;
generate a bag-of-words corresponding to the first coding technique based on the parsed first text; and
send the first update to the database including the bag-of-words.

16. A method comprising:
receiving a request to identify a coding expert, the request comprising first text of a draft implementation of a first machine-learning algorithm from a user that is drafting the draft implementation of the first machine-learning algorithm;
querying a database to determine if the database comprises a first machine-learning coding technique corresponding to the first machine-learning algorithm, the database storing data indicative of algorithm functions and languages corresponding to a plurality of authors;
responsive to receiving an indication that the database does not have the first machine-learning coding technique, updating the database to include data indicative of the first text and a name of each of one or more authors of the first text;
determining if the draft implementation comprises additional machine-learning coding techniques by comparing the first text to a library of machine-learning techniques terms; and
responsive to identifying a second coding technique based on the library of machine-learning coding techniques, updating the database to include data indicative of the second machine-learning coding technique.

17. The method of claim 16, wherein updating the database further comprises:
analyzing the first text using one or more natural language processing techniques; and
generating a model of the first text comprising one or more words associated with machine-learning algorithms.

18. The method of claim 17, further comprising:
scraping a repository to identify a plurality of scripts comprising a plurality of machine-learning algorithms;
identifying one or more authors associated with each machine-learning algorithm of the plurality of machine-learning algorithms based on information stored in the repository about the plurality of scripts; and
storing data indicative of the plurality of machine-learning algorithms and the respective one or more authors in the database.

19. The method of claim 18, further comprising;
outputting, to an administration device, a request for verification that the additional machine-learning techniques are of a particular type; and
sending a second update responsive to receiving a verification from the administration device.

20. The method of claim 18, wherein receiving the first text comprises:
recognizing, from the first text, a first draft machine-learning algorithm using one or more natural language processing techniques and comparing the first text to the library storing a plurality of machine-learning algorithms.

* * * * *